United States Patent [19]

Konishi et al.

[11] 4,179,164
[45] Dec. 18, 1979

[54] BRAKING PRESSURE CONTROL VALVE UNIT

[75] Inventors: Hiromu Konishi, Toyota; Kiyoshi Nishiwaki, Susono, both of Japan

[73] Assignee: Toyota Jidosha Kogyo Kabushiki Kaisha, Toyota, Japan

[21] Appl. No.: 913,434

[22] Filed: Jun. 7, 1978

[30] Foreign Application Priority Data

Jul. 26, 1977 [JP] Japan .................................. 52-89585

[51] Int. Cl.$^2$ ........................... B60T 8/14; B60T 8/26
[52] U.S. Cl. ................................. 303/24 F; 303/24 C
[58] Field of Search ............ 188/349; 303/6 C, 22 R, 303/24 R, 24 A, 24 C, 24 F

[56] References Cited

U.S. PATENT DOCUMENTS 3,663,067  5/1978  Yabuta .................................. 303/6 C

FOREIGN PATENT DOCUMENTS 1079505  8/1967  United Kingdom .................. 303/24 C

*Primary Examiner*—Stephen G. Kunin
*Attorney, Agent, or Firm*—Kenyon & Kenyon

[57] ABSTRACT

An inertia-controlled valve unit includes a valve seat provided within a valve chamber and a ball disposed within the valve chamber to co-operate with the valve seat and rolling toward the valve seat to cut-off excessive braking pressure applied to rear wheel brake cylinders. The inertia-controlled valve unit comprises a solenoid winding attached to the valve housing, a plunger passing through the solenoid winding into the valve chamber and located behind the ball, the plunger being moved forwardly by energization of the solenoid winding to engage the ball against the valve seat, a normally open switch attached to a portion of a push-rod for connecting the solenoid winding to a source of electricity when closed, and a movable element slidable on the push-rod to be displaced toward the switch by inertia force acting thereon when the brake pedal is rapidly depressed, the movable element closing the switch when engaged with the switch.

3 Claims, 2 Drawing Figures

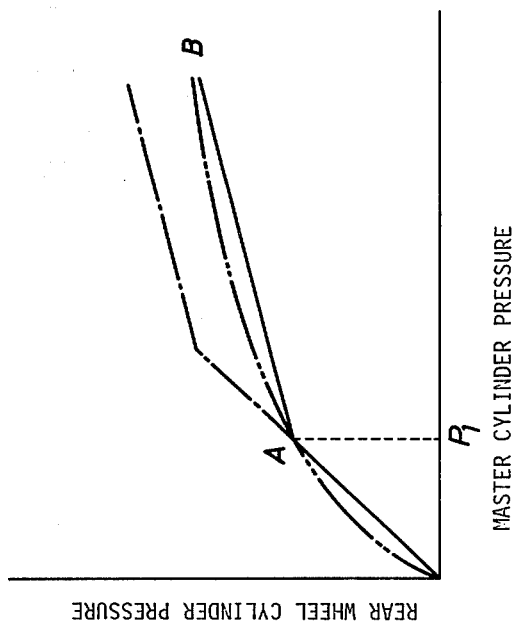

BRAKING PRESSURE CONTROL VALVE UNIT

BACKGROUND OF THE INVENTION

The present invention relates to a fluid pressure control device for a vehicle braking system, and more particularly to a fluid pressure control device of the type in which an inertia-controlled valve unit is adapted to control the braking pressure applied to rear wheel brake cylinders from a master cylinder in accordance with the rate of deceleration of the vehicle.

An inertia-controlled valve unit of the type includes a movable ball disposed within a valve chamber to co-operate with a valve seat and rolling towards the valve seat on the inclined bottom of the chamber to cut-off excessive braking pressure applied to the rear wheel cylinders. The valve unit is usually mounted at an inclined angle on a vehicle body frame supported by a suspension system such that the ball rests under gravity in a normal position to open the valve and rolls towards the valve seat to close the valve when the ball is subjected to a deceleration is excess of a predetermined value. In practical use of the valve unit, if the master cylinder is rapidly operated by emergency depression of the brake pedal, the emergency braking operation causes forward displacement of the vehicle body frame against the spring suspended wheel axles due to the moment of inertia. This decreases the rate of deceleration acting on the ball less than that acting on the wheel axles and subsequently the rolling operation of the ball delays to occur mis-operation of the valve unit.

SUMMARY OF THE INVENTION

The primary object of the present invention is directed to provide an improved inertia-controlled valve unit in which the ball is forcibly moved toward the valve seat to effectively close the valve in rapid operation of the master cylinder.

According to the present invention, there is provided an improved fluid pressure control device for incorporation in a vehicle braking system between a master cylinder and rear wheel brake cylinders, the master cylinder being operated by a push-rod of a brake pedal, which control device comprises:

a housing adapted to be mounted on a vehicle body frame, the housing being provided thereon with an inlet port for connection to the master cylinder and an outlet port for connection to the rear wheel brake cylinders and provided therein with a valve chamber in communication with the inlet and outlet ports;

a cut-off valve including a valve seat provided within the valve chamber to permit fluid flow therethrough, and an inertia-controlled ball disposed within the valve chamber for normally permitting fluid communication between the inlet and outlet ports through the vlave seat but adapted to co-operate with the valve seat to cut-off the fluid communication when the ball is subjected to a deceleration in excess of a predetermined value;

solenoid means having a solenoid winding attached to the housing and a plunger extending through the solenoid winding into the valve chamber and located behind the ball, the plunger being moved forwardly by energization of the solenoid winding to engage the ball against the valve seat;

a normally open switch means attached to a portion of the push-rod for connecting the solenoid winding to a source of electricity when closed; and a movable element slidable on the push-rod to be displaced toward the switch means by inertia force acting thereon when the brake pedal is rapidly depressed, the movable element closing the switch means when engaged with the switch means.

BRIEF DESCRIPTION OF THE DRAWINGS

The above and other objects, features and attendant advantages of the present invention will be more fully appreciated as the same becomes better understood from the following detailed description of the preferred embodiment when considered in connection with the accompanying drawings in which:

FIG. 2 is a graph indicating the pressure controlling characteristics of the control device.

DESCRIPTION OF THE PREFERRED EMBODIMENT

Figure 1:
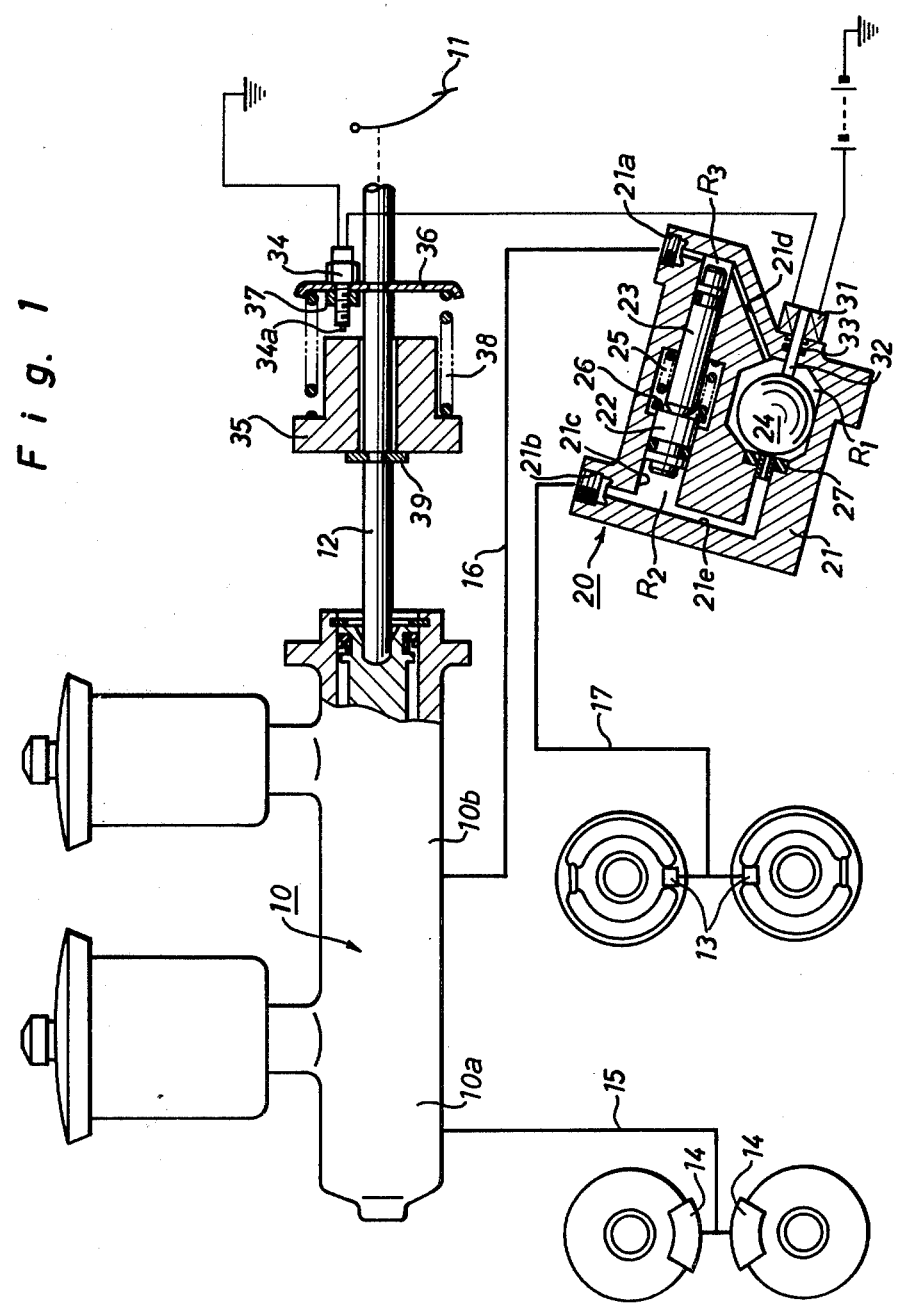
FIG. 1 is a schematic diagram of a vehicle braking system, showing the installation arrangement of a fluid pressure control device in accordance with the present invention.

Referring now to FIG. 1 of the accompanying drawings, there is illustrated a conventional tandem master cylinder 10 which is operated by pushing force added to a push-rod 12 upon depression of a brake pedal 11. The master cylinder 10 is provided with a front pressure chamber 10a directly connected to front wheel brake cylindrs 14 by way of a pipe 15 and a rear pressure chamber 10b connected to rear wheel brake cylinders 13 by way of pipes 16 and 17. Interposed between the pipes 16 and 17 is an inertia-controlled valve unit 20 in accordance with the present invention.

The inertia-controlled valve unit 20 is fixedly mounted on a vehicle body frame (not shown) at an inclined angle in relation to the horizontal. The valve unit 20 comprises a housing 21 which is provided therein with a small diameter piston 23, a large diameter piston 22 and an inertia-controlled ball 24. The housing 21 is provided thereon with an inlet port 21a connected to the pipe 16 and an outlet port 21b connected to the pipe 17. Within the housing 21, there are provided in parallel a stepped cylindrical bore 21c and a valve chamber $R_1$. The stepped cylindrical bore 21c includes a small diameter portion to which the inlet port 21a opens and a large diameter portion to which the outlet port 21b opens. The valve chamber $R_1$ is communicated with the small and large diameter portions of the stepped bore 21c respectively by way of a first passage 21d and a second passage 21e.

The large diameter piston 22 is reciprocably engaged within the large diameter portion of the stepped bore 21c through an annular seal member to form a fluid chamber $R_2$ to which the outlet port 21b opens directly. The small diameter piston 23 is reciprocably engaged within the small diameter portion of the stepped bore 21c through an annular seal member to form a fluid chamber $R_3$ to which the inlet port 21a directly opens. A compression coil spring 25 is interposed between an inner end wall of the housing 21 and an annular retainer 26 in such a manner that the large diameter piston 22 is normally biased toward the outlet port 21b.

The inertia-controlled ball 24 housed within the valve chamber $R_1$ is free to roll forwardly on the inclined bottom of the valve chamber $R_1$ and co-operates with an annular valve seat 27 secured to the side wall of the chamber $R_1$ to provide a cut-off valve. The ball 24 normally rests under gravity in the position shown in the drawing and is received by a plunger 32 in a solenoid winding 31 which is attached to the outside wall of the housing 21. In normal braking operation, when the rate of deceleration caused by the application of the brakes exceeds a predetermined value, the ball 24 will roll forwardly by the inertia force acting thereon toward the valve seat 27 so that the cut-off valve is closed to interrupt fluid communication between the fluid chambers $R_2$ and $R_3$.

The plunger 32 in the solenoid winding 31 extends into the valve chamber $R_1$ through seal members 33 and located behind the ball 24 to be moved in a forward direction by energization of the solenoid winding 31. The solenoid winding 31 is connected at one end thereof with a source of electricity and grounded at the other end thereof through a normally open switch 34. The switch 34 is secured to a mounting plate 36 by fastening nut 37 and has a feeler 34a which is arranged to be engaged with the rear face of a movable element 35. The mounting plate 36 is fixed to a portion of the push-rod 12, and the movable element 35 is slidably mounted on the push-rod 12 in front of the plate 36. The movable element 35 is biased by a compression coil spring 38 in the forward direction and is received by a retainer clip 39 which is fixed to a portion of the push-rod 12. If the master cylinder 10 is rapidly operated by emergency depression of the brake pedal 11, the movable element 35 will displace toward the mounting plate 36 to be engaged with the feeler 34a of the switch 34.

During travel of the vehicle, normal depression of the brake pedal 11 produces fluid pressure within the respective pressure chambers 10a and 10b of the master cylinder 10. The pressure in the front pressure chamber 10a is directly applied to the front wheel brake cylinders 14 through the pipe 15, and the pressure in the rear pressure chamber 10b is applied to the inlet port 21a of the valve unit 20 through the pipe 16. The master cylinder pressure applied into the inlet port 21a is applied to the fluid chamber $R_2$ via the fluid chamber $R_3$, the first passage 21d, the valve chamber $R_1$, the valve seat 27 and the second passage 21e in sequence, and, then, applied to the rear wheel brake cylinders 13 through the outlet port 21b and the pipe 17 to operate the rear wheel brakes. Thus, the vehicle is braked in accordance with the value of the master cylinder pressure applied to the front and rear wheel brake cylinders 14 and 13. In this instance, the movable element 35 on the push-rod 12 is held in the original position due to biasing force of the spring 38 because of small inertia moment acting on the element 35. As a result, the feeler 34a may not be engaged with the element 35 so that the switch 34 is maintained in its open position and the solenoid winding 31 is remained in the deenergized condition.

In the braking operation, the rate of deceleration acting on the ball 24 increases in value in response to the increase of the master cylinder pressure, since the vehicle body frame makes little forward movement against its spring suspended axles. When the master cylinder pressure reaches a value $P_1$ to increase the rate of deceleration acting on the ball 24 to a predetermined value, the ball 24 rolls forwardly and moves into engagement with the valve seat 27 to close the cut-off valve to interrupt fluid communication between the fluid chambers $R_2$ and $R_3$, which is indicated by a character A in FIG. 2. If the master cylinder pressure is further increased by continued depression of the brake pedal 11, the pressure acting on the small diameter piston 23 moves the large diameter piston 22 toward the outlet port 21b. Then, the large piston 22 acts on the fluid trapped in the pipe 17 to the rear wheel brake cylinders 13 by closing of the cut-off valve and increases the pressure in the pipe 17, but owing to the difference between the effective pressure receiving areas of the pistons 22 and 23 the rate of increase is less than the rate of increase in the master cylinder pressure, as shown by a segment line between characters A and B in FIG. 2. Thus, the desired accuracy in pressure controlling operation is maintained by the valve unit 20.

During travel of the vehicle, if the master cylinder pressure is rapidly increased by emergency depression of the brake pedal 11, the braking operation will shift part of the weight of the vehicle at the rear axle to the front axle due to the moment of inertia. This causes forward displacement of the vehicle body frame and decreases the rate of deceleration acting on the ball 24. In this instance, upon depression of the brake pedal 11, the movable element 35 is displaced toward the mounting plate 36 against the spring 38 and is engaged with the feeler 34a to close the switch 34. This energizes the solenoid winding 31 to move the plunger 32 in the forward direction. Then, the forward movement of the plunger 32 moves the ball 24 into engagement with the valve seat 27 to close the cut-off valve. In the emergency braking operation, it will be noted that the cut-off valve is instantly closed despite of decrease of the rate of deceleration acting on the ball 24. As a result, the braking pressure to the rear wheel brake cylinders 13 is controlled by the valve unit 20 substantially the same as in the normal braking operation.

Although a certain specific embodiment of the present invention has been shown and described, it is obvious that the present invention may be adapted to various type of inertia-controlled valve units including an inertia-controlled ball therein. It is to be understood therefore that within the scope of the appended claims, the invention may be practiced otherwise than as specifically described herein.

What is claimed is:

1. In a fluid pressure control device for a vehicle braking system incorporating between a master cylinder and rear wheel brake cylinders, said master cylinder being operated by a push-rod of a brake pedal, which control device comprises a housing adapted to be mounted on a vehicle body frame, said housing being provided thereon with an inlet port for connection to said master cylinder and an outlet port for connection to said rear wheel brake cylinders and provided therein with a valve chamber in communication with said inlet and outlet ports; a valve seat provided within said valve chamber to permit fluid flow therethrough; and an inertia-controlled ball disposed within said valve chamber for normally permitting fluid communication between said inlet and outlet ports through said valve seat but adapted to co-operate with said valve seat to cut-off the fluid communication when said ball is subjected to a deceleration in excess of a predetermined value;

the improvement comprising:
solenoid means having a solenoid winding attached to said housing and a plunger extending through said solenoid winding into said valve chamber and located behind said ball, said plunger being moved forwardly by energization of said solenoid winding to engage said ball against said valve seat;

a normally open switch means attached to a portion of said push-rod for connecting said solenoid winding to a source of electricity when closed; and a movable element slidable on said push-rod to be displaced toward said switch means by inertia force acting thereon when said brake pedal is rapidly depressed, said movable element closing said switch means when engaged with said switch means.

2. A fluid pressure control device as claimed in claim 1, wherein said switch means is secured to a plate fixed to a portion of said push-rod and has a feeler extended forwardly from said plate to be engaged with said movable element to close said switch means, and wherein said movable element is received by a stopper on said push-rod in front of said plate and is resiliently separated by a spring from said feeler, said movable element engaging said feeler when it is displaced toward said plate by inertia force acting thereon.

3. A fluid pressure control device as claimed in claim 1, wherein said housing is provided therein with a stepped bore in parallel with said valve chamber and in communication with said inlet and outlet ports respectively at the small and large diameter portions thereof, and wherein a differential piston is slidably disposed within said stepped bore to provide fluid chambers respectively in open communication with said inlet and outlet ports, the smaller end of said piston being exposed toward said inlet port and the larger end toward said outlet port, and a spring is provided to bias said piston axially in a direction toward said outlet port.

* * * * *